(12) United States Patent
Anderson et al.

(10) Patent No.: US 6,297,691 B1
(45) Date of Patent: Oct. 2, 2001

(54) METHOD AND APPARATUS FOR DEMODULATING COHERENT AND NON-COHERENT MODULATED SIGNALS

(75) Inventors: Stephen D. Anderson, Edina; Daniel V. Hulse, Prior Lake; Kevin B. Moore, Chaska; Paul D. Kammann, Golden Valley; Gabriel A. Maalouf, Minneapolis, all of MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/592,464

(22) Filed: Jun. 9, 2000

(51) Int. Cl.[7] .............................. H03D 3/00; H04L 27/14; H04L 27/227; H04L 27/32
(52) U.S. Cl. ........................ 329/300; 329/304; 329/308; 329/316; 375/325; 375/326; 375/327; 375/328
(58) Field of Search ................................ 329/300, 302, 329/303, 304, 307, 308, 309, 310, 316; 375/324, 325, 326, 327, 328

(56) References Cited

U.S. PATENT DOCUMENTS

| | | | |
|---|---|---|---|
| 3,571,712 | * 3/1971 | Hellwarth et al. | 329/306 |
| 4,065,722 | * 12/1977 | Francis | 329/304 |
| 4,674,105 | * 6/1987 | Suzuki | 329/304 |
| 5,430,770 | * 7/1995 | Abbey | 375/349 |
| 5,691,974 | 11/1997 | Zehavi et al. | 370/203 |

* cited by examiner

Primary Examiner—Siegfried H. Grimm
(74) Attorney, Agent, or Firm—Westman, Champlin & Kelly, P.A.

(57) ABSTRACT

A receiver receives modulated message signals in non-coherent FSK and coherent 8PSK protocols. A selectively configurable processor demodulates the message signals, and includes a demodulator that derives in-phase and quadrature signals based on the message signals. A phase detector is responsive to the in-phase and quadrature signals and delayed in-phase and quadrature signals to derive a phase signal. A selector is responsive to the in-phase and quadrature signals to selectively connect a loop filter between the phase detector and the demodulator. When the selector connects the filter between the phase detector and demodulator, the demodulator is responsive to filtered phase signals to lock onto a frequency of the message signals so that the processor operates as a phase locked loop to demodulate coherent modulated signals. When the selector disconnects the filter from between the phase detector and the demodulator, the demodulator demodulates non-coherent modulated signals and the phase detector supplies a phase signal representing the slope of the phase of the demodulated signal.

20 Claims, 4 Drawing Sheets

METHOD AND APPARATUS FOR DEMODULATING COHERENT AND NON-COHERENT MODULATED SIGNALS

BACKGROUND OF THE INVENTION

An industrial process control transmitter is a transducer that responds to a process variable and provides a standardized transmission signal as a function of the measured variable. The term "process variable" refers to a physical or chemical state of matter or conversion of energy. Examples of process variables include pressure, temperature, flow, conductivity, pH, and other properties. One such transmitter is an industrial process pressure transmitter used to measure flow (difference of two pressures), level (head or back pressure), and temperature (fluid pressure in a thermal system). Such transmitters are used in industrial processes, such as with slurries, liquids, vapors and gasses in chemical, pulp, petrochemical, gas, pharmaceutical, food, and other fluid processing plants.

Process control transmitters are often operated in hazardous field environments and are connected by two-wire communication lines to a central or control station. Typically, the central or control station additionally supplies operating power to the remote process control transmitters on the two-wire communication line. A typical two-wire system permits both analog and digital communications between the central station and the remote transmitter. Typically, the analog communications is performed between 4 and 20 microamperes (mA). One well-known digital communications system for two-wire process control systems is the HART® system, commercially available from Rosemount Inc. of Eden Prairie, Minn. The HART system provides communication between the central station and the remote field transmitter.

The HART system uses a half-duplex master-slave protocol. Typically the master sends a command and then expects a reply; the slave waits for a command and sends a reply. Each command or reply is a message, varying in length from a few bytes to as many as 30 bytes. The message consists of asynchronous serial data transmitted at 1,200 bits per second (BPS). Transmission is accomplished through frequency-shift-keying (FSK) such that a logical 1 is represented by a 1,200 Hertz (Hz) signal and a logical 0 is represented by a 2,200 Hz signal. These HART protocol signals are modulated onto the two-wire communications line carrying the D.C. power.

Using the HART communication protocol, a message transaction is initiated by the central or control station sending a command to a specified field transmitter, usually by addressing the field transmitter with a unique address. The command may, for example, direct the transmitter to reply with information as to its status, such as current pressure sensed, etc. Upon receipt of the command from the control station, the transmitter sends a reply to the control station which is received and processed. (In some cases, the transmitter may be programmed to send a reply repeatedly without need for the control station to send a command each time.) The HART system permits the control station to conduct approximately two or three transactions per second. If a large number of field transmitters are connected to the control station by the same two-wire communication channel, the limited number of transactions limits the communication volume, which in turn limits the control functions that might be achieved. Consequently, Rosemount Inc. developed a communications system, called "HSH", having a greater volume that permits a greater number of transactions.

HART signals are non-coherent FSK signals that are demodulated by first mixing with a free-running local oscillator frequency of 1700 Hz, and then identifying the phase of the resultant signal. Mixing the HART signals with the 1700 Hz frequency shifts the 1,200 Hz (binary 1) and 2,200 Hz (binary 0) signals to +/−500 Hz signals. The phase of the resultant signal will either continuously increase, thus indicating that the resultant signal was derived from the 1,200 Hz signal, or the phase will continuously decrease, thus indicating that the resultant signal was derived from the 2,200 Hz signal. Bit recognition of the HART protocol is achieved by sensing whether the phase is increasing (binary 1) or decreasing (binary 0).

The HSH system employs a bandwidth-efficient technique known as 8-ary phase shift keying (8PSK) that allows transmission of symbols at the rate of 3,200 symbols per second. The carrier is shifted among eight possible phases, or symbols, each of which represents three binary bits. Consequently, the 3,200 symbols per second rate yields a bit rate of 9,600 BPS. HSH decodes the in-phase and quadrature amplitudes of the coherent 8PSK signal to identify the symbol, and hence the three-bit representation. HSH signals are demodulated by mixing the signal with a coherent local oscillator at a frequency of 3200 Hz. Thus, the HART and HSH protocols require different demodulation techniques for receiving and demodulating signals.

The HART protocol includes a preamble followed by the user message. The preamble is used to set the gain of gain control circuits to assure proper signal strength to the receiver, and is used to synchronize the local oscillator to the bit rate of the message. The HSH protocol also includes a preamble of certain 8PSK symbols that set the gain of the gain control circuits, lock a phase lock loop onto the 8PSK carrier frequency and establish operating parameters of an equalizer filter. The messages in both HART and HSH protocols are reasonably short. The HART protocol messages usually are no greater than 30 bytes, with a maximum duration of 200 milliseconds (msec). The HSH protocol messages employ preambles that are typically 64 symbols, followed by the user message of up to 128 symbols, representing 48 bytes of user data requiring a maximum duration of 60 msec. Hence, the HSH protocol permits a greater number of transactions per second, and larger user messages, than the HART protocol.

A large number of transmitters currently in the field employ the HART protocol. Accordingly, it is economically unfeasible to convert those transmitters to HSH protocol. Moreover, the HART protocol is adequate in many field environments, such as in control systems not requiring a large number of field transmitters or a large volume of messages. Nevertheless, as the smaller control systems become more complex, it is desirable to use the HSH protocol in certain circumstances. Accordingly, there is a need for a single receiver system that automatically detects the incompatible communication protocols and demodulates the signals in accordance with the detected protocol. In particular, there is a need for a single circuit that is capable of demodulating signals in both HART and HSH protocol, requiring minimal number of functional blocks, thereby minimizing current consumption and cost.

SUMMARY OF THE INVENTION

An industrial process control instrument according to the present invention has a receiver for receiving and demodulating message signals that are modulated in either a coherent signal protocol or a non-coherent signal protocol. A processor receives the message signals and is selectively configurable to a first configuration to demodulate message signals modulated in the non-coherent signal protocol. Demodulation of the message signals in the non-coherent protocol provides phase slope signals representing either an increasing and decreasing slope of a phase of the message signal. The processor is also selectively configurable to a second configuration to demodulate message signals modulated in the coherent signal protocol. Demodulation of the message signals in the coherent protocol provides in-phase and quadrature signals representing a phase relationship of the message signals received by the input. A phase slope detector identifies the protocol of the received message signals. A switch switches the processor between its first and second configurations.

In preferred embodiments, a demodulator is responsive to the message signal to derive in-phase and quadrature signals based on the message signal. A phase detector detects a phase of the message signal. The switch connects a loop filter between the phase detector and demodulator so that the phase detector and demodulator operate as a phase locked loop to demodulate the coherent message signal. The switch disconnects the demodulator from the phase detector so that the demodulator operates under control of a local oscillator to demodulate the non-coherent message signal.

In specific embodiments, the coherent signal protocol is a phase shift keying (PSK) protocol and the non-coherent signal protocol is a frequency shift keying (FSK) protocol. The phase slope detector is responsive to the in-phase and quadrature signals and to the phase signal from the phase detector to selectively connect a loop filter between the phase detector and the demodulator. The demodulator is responsive to filtered phase signals to lock onto a frequency of the input signals when the switch connects the loop filter between the phase detector and the demodulator so that the phase detector, loop filter and demodulator operate as a phase locked loop to demodulate PSK signals. The selector operates the demodulator to demodulate FSK signals when the selector does not connect the loop filter between the phase detector and the demodulator.

In one form, the demodulator includes a controllable oscillator providing an oscillator signal having a selectively controllable frequency, and first and second multipliers coupled to receive the message signals and to the oscillator to derive respective in-phase and quadrature signals based on the message signals. The phase detector includes third and fourth multipliers and a subtractor. The third and fourth multipliers are responsive to the in-phase and quadrature signals and to first and second reference signals based on the delayed quadrature and in-phase signals. The subtractor derives the phase signal.

In another form, the invention provides a process of demodulating coherent and non-coherent modulated industrial process control message signals at an input of a receiver of an industrial process control instrument. In-phase and quadrature signals are derived from the input modulated signals. A phase signal is derived from the in-phase and quadrature signals. The presence or absence of coherent modulated signals is detected from the in-phase and quadrature signals. If coherent modulated signals are detected, a filter is coupled between a phase detector and a demodulator so that the demodulator, phase detector and filter operate as a phase locked loop to demodulate input modulated signals. If non-coherent modulated signals are detected, the demodulator is operated at a default frequency to demodulate input modulated signals.

DETAILED DESCRIPTION OF THE PREFERRED EMBODIMENTS

Figure 1:
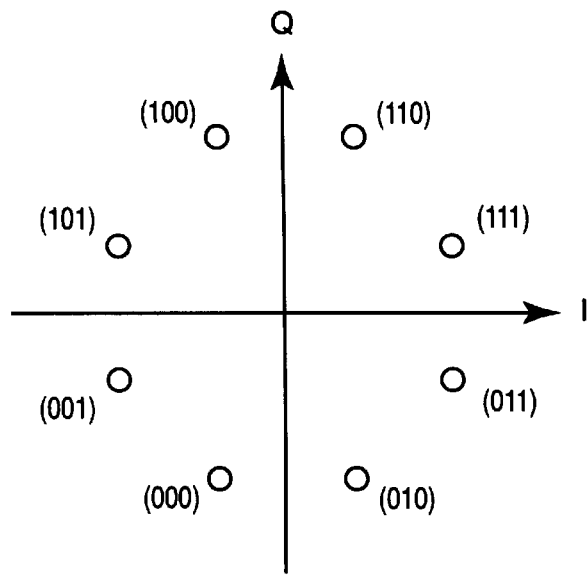
FIG. 1 is a constellation diagram illustrating phase relationships of symbols in the 8PSK protocol.

Communications systems that carry message signals modulated in incompatible communications protocols required receivers having separate demodulators for each protocol. The inclusion of separate demodulators at each receiver is costly, both in terms of power consumption and expense. The present invention is directed to a receiver that includes a demodulator that detects message signal protocol to configure the demodulator to demodulate the message signal. Functional blocks of the demodulator are configured for each protocol so that the functional blocks are shared by the several protocols, thereby minimizing power consumption and expense.

While the present invention will be described in connection with the HART frequency shift keying (FSK) and HSH 8-ary phase shift keying (8PSK) protocols, the invention is equally applicable to demodulation of other incompatible coherent and non-coherent signals.

FSK modulation, such as the HART protocol, is a non-coherent protocol that employs different frequencies to represent different bits. The HART protocol, for example, employs a signal frequency of 1,200 Hertz (Hz) for a logical 1, and a signal frequency of 2,200 Hz for a logical 0. FSK signals are demodulated using a local oscillator operating at a frequency between the two signal frequencies. Thus for the HART protocol, the local oscillator operates at 1,700 Hz to shift the two FSK frequencies to ±500 Hz. Thus, when the upper frequency (2,200 Hz) is received, representative of a logical 0, the demodulator output consists of signals rotating clockwise around a unit circle at 500 Hz. When a lower frequency (1,200 Hz) is received, representative of a logical 1, the demodulator output consists of signals rotating counter-clockwise around the unit circle at 500 Hz. Detection, therefore, is based on measuring the slope of the phase. When the upper frequency (logical 0) is received, the phase of the demodulator output is continuously decreasing, whereas when the lower frequency (logical 1) is received, the phase is continuously increasing. Hence, the slope of the phase represents the 1 or 0 logic level.

In contrast, the 8PSK modulation, as used in the HSH protocol, is a coherent protocol that employs eight phases of a 2880 Hz carrier. The eight phases represent eight respective symbols. FIG. 1 is a constellation diagram for 8PSK modulation, illustrating the eight symbols, their corresponding I (in-phase) and Q (quadrature) amplitudes, and the three-bit representation of each symbol. Table I identifies the symbol, binary value and the I and Q amplitudes represented by positive and negative high and low amplitudes. Thus, symbol 3 represents binary 011 and has a high positive I amplitude and a low negative Q amplitude. It will be appreciated that each symbol has a unique combination of I and Q amplitudes.

TABLE I

| Symbol | Binary Value | Phase | I Amplitude | Q Amplitude |
|---|---|---|---|---|
| 0 | 000 | $-5\pi/8$ | − Low | − High |
| 1 | 001 | $-7\pi/8$ | − High | − Low |
| 2 | 010 | $-3\pi/8$ | + Low | − High |
| 3 | 011 | $-\pi/8$ | + High | − Low |
| 4 | 100 | $5\pi/8$ | − Low | + High |
| 5 | 101 | $7\pi/8$ | − High | + Low |
| 6 | 110 | $3\pi/8$ | + Low | + High |
| 7 | 111 | $\pi/8$ | + High | + Low |

Ignoring bandwidth pulse shaping, the transmitted signal is represented by $$A(t) = A_0[I \cos(\omega t) + Q \cos(\omega t + \pi/2)],$$

where $A(t)$ is the output current as a function of time t, $A_0$ is the nominal amplitude, $\omega$ is the carrier frequency and I and Q are the in-phase and quadrature components of the phase $\theta$ ($I = \cos\theta$ and $Q = \sin\theta$). It will be appreciated that the 8FSK signal is a phase modulated signal, and in the environment of the HSH protocol, operates at a symbol rate of 3,200 symbols per second yielding a bit rate of 9,600 bits per second (BPS).

Figure 2:
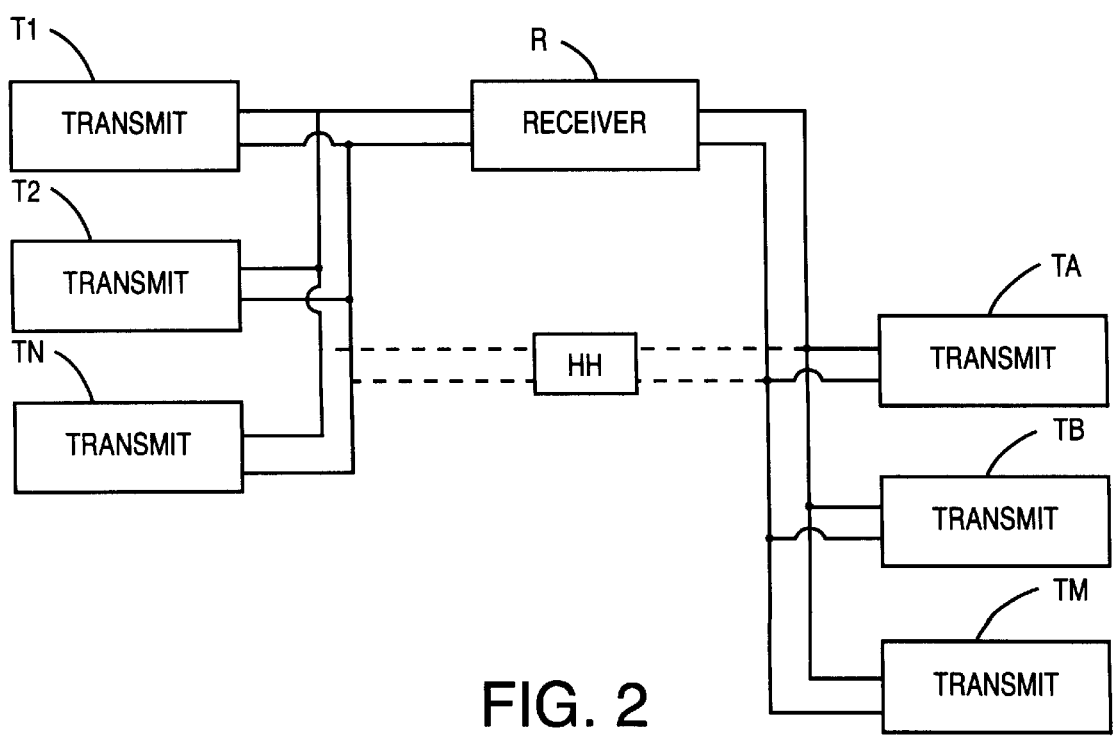
FIG. 2 is a diagram illustrating a typical industrial process control system employing the principles of the present invention.

FIG. 2 is a diagram illustrating the environment of industrial process control systems. A typical system includes a plurality of remote field transmitters T1, T2 . . . Tn coupled by a two-wire communication link to a central control station R. Control station R might support plural transmitter networks, such as a second network that includes remote field transmitters Ta, Tb . . . Tm. The central control station R transmits requests to one or more transmitters T via the respective two-wire communication link. The addressed remote transmitter T sends a reply to central control station R via the same two-wire communication link. If the remote transmitter is capable of transmitting reply messages in both HART and HSH protocol, the remote transmitter is usually programmed to transmit its reply in the same protocol as the request message. In any case, at least some of the remote transmitters and central station are able to receive messages in both HART and HSH protocols. Where the central control station is capable of receiving in both HART and HSH protocols, the two-wire communication link might be connected to one or more remote transmitters that transmit only in HART protocol and one or more remote transmitters that transmit only in HSH protocol.

In some cases, a hand-held communication unit HH might be included to communication directly with a field transmitter T. The hand-held unit might, for example, be used by field personnel monitoring the industrial process or servicing the transmitters. The hand-held unit may be connected by radio link, or connectable to the existing two-wire link. Like the remote transmitters and central control station, the hand-held unit is a transceiver that communicates in the HART or HSH protocol, or both. Additionally, the two-wire links might be connected to a transceiver that connects to the central station by another communication mode of choice, such as satellite, microwave, radio link, cellular telephone, and hard-wire telephone.

The two-wire link to the transmitters is especially useful where power is supplied by the central station or the transceiver to the transmitter.

Different transmitters T might employ different protocols for transmitting messages to receiver R or hand-held unit HH. For example, one or more transmitters might transmit message signals in the HART protocol, whereas other transmitters might transmit message signals in the HSH protocol. Similarly, the transmitters T might receive messages in the HART protocol as well as in the HSH protocol from central control station R or hand-held unit HH. The present invention is directed to apparatus for demodulating and decoding both HART and HSH message signals in an industrial process control instrument, namely an industrial process control transmitter T, a central control station R of an industrial process control system, or a hand-held transceiver HH used with an industrial process control system.

Figure 3:
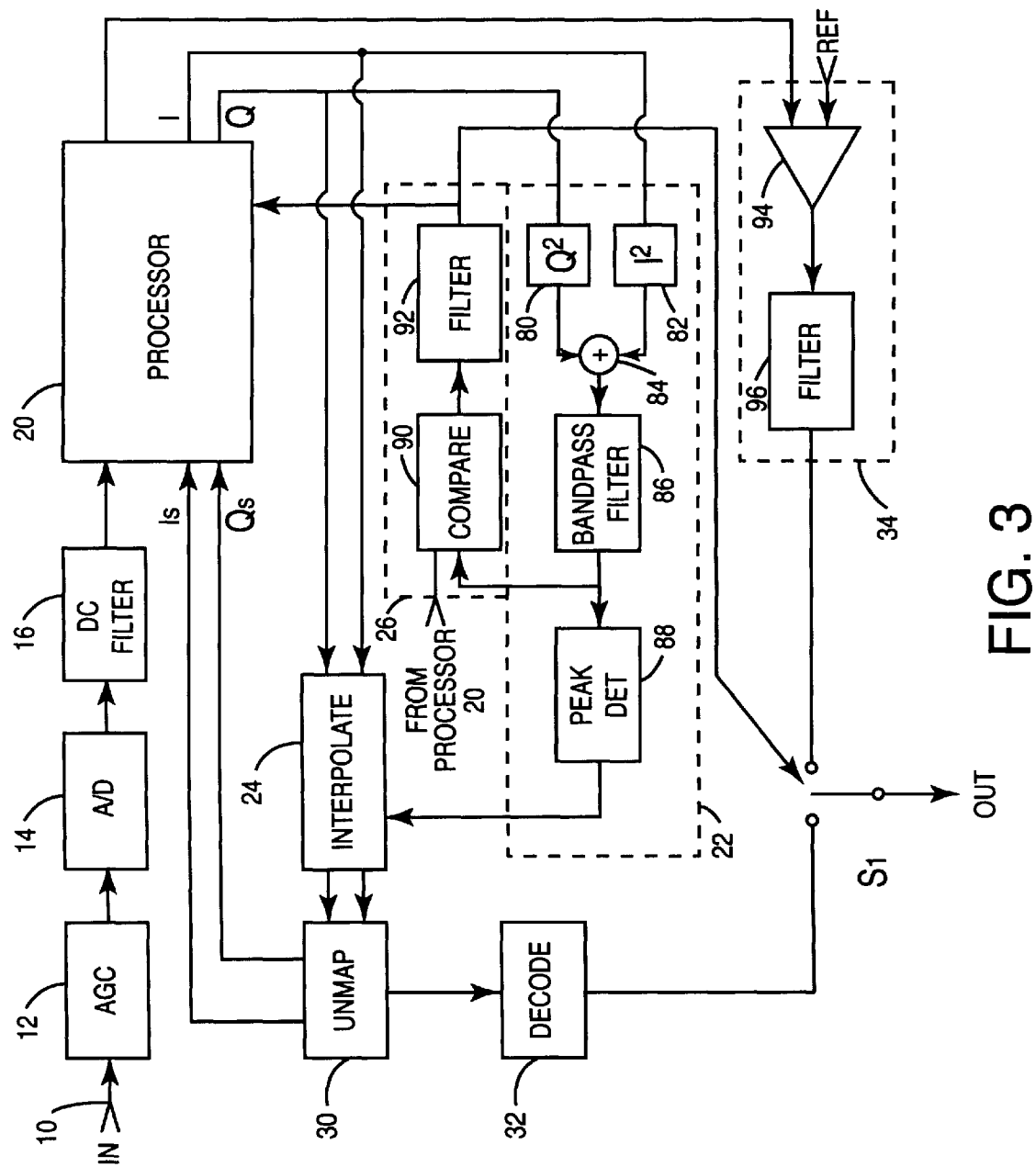
FIG. 3 is a block diagram of a receiver for demodulating and decoding message signals modulated in the 8PSK and FSK protocols in accordance with the present invention.

FIG. 3 is a block diagram of a receiver for receiving and decoding message signals modulated in the non-coherent FSK protocol and the coherent 8PSK protocol. The receiver includes an input 10 for receiving modulated message signals, an automatic gain control 12, analog-to-digital converter 14 that converts the analog signals to digital signals, and a DC filter 16 to remove DC offset from the digital signals. The resulting carriers, in FSK or 8PSK protocol, are supplied to processor 20. Processor 20 demodulates the digital carrier signals and provides I and Q outputs to symbol synchronization circuit 22 and to interpolate circuit 24. As will be more fully explained hereinafter, the I and Q signals represent the in-phase and quadrature amplitudes of the input modulated signal.

Symbol synchronization circuit 22 is responsive to the I and Q signals to provide signals to interpolate circuit 24 to permit the interpolate circuit to select a sample of demodulated 8PSK protocol output from processor 20 for unmap circuit 30. Phase slope detector circuit 26 receives signals from symbol synchronization circuit 22 to identify the protocol of the input signal and operate electronic switch S1 and an electronic switch S2 in processor 20 (to be described in connection with FIG. 4).

Unmap circuit 30 is responsive to the I and Q signals from interpolate circuit 24 to provide reference I and Q signals ($I_s$ and $Q_s$) to processor 20. Unmap circuit 30 also unmaps the I and Q signals to provide symbol signals to decode circuit 32. Decode circuit 32 decodes the symbol signals to binary signals and provides the binary signals to a first selection of switch S1.

Processor 20 also provides phase slope signals, representative of the increasing or decreasing slope of the phase of input modulated FSK signals, to decode circuit 34, which in turn provides binary signals representative of the input FSK message signals to a second selection of switch S1.

Figure 4:
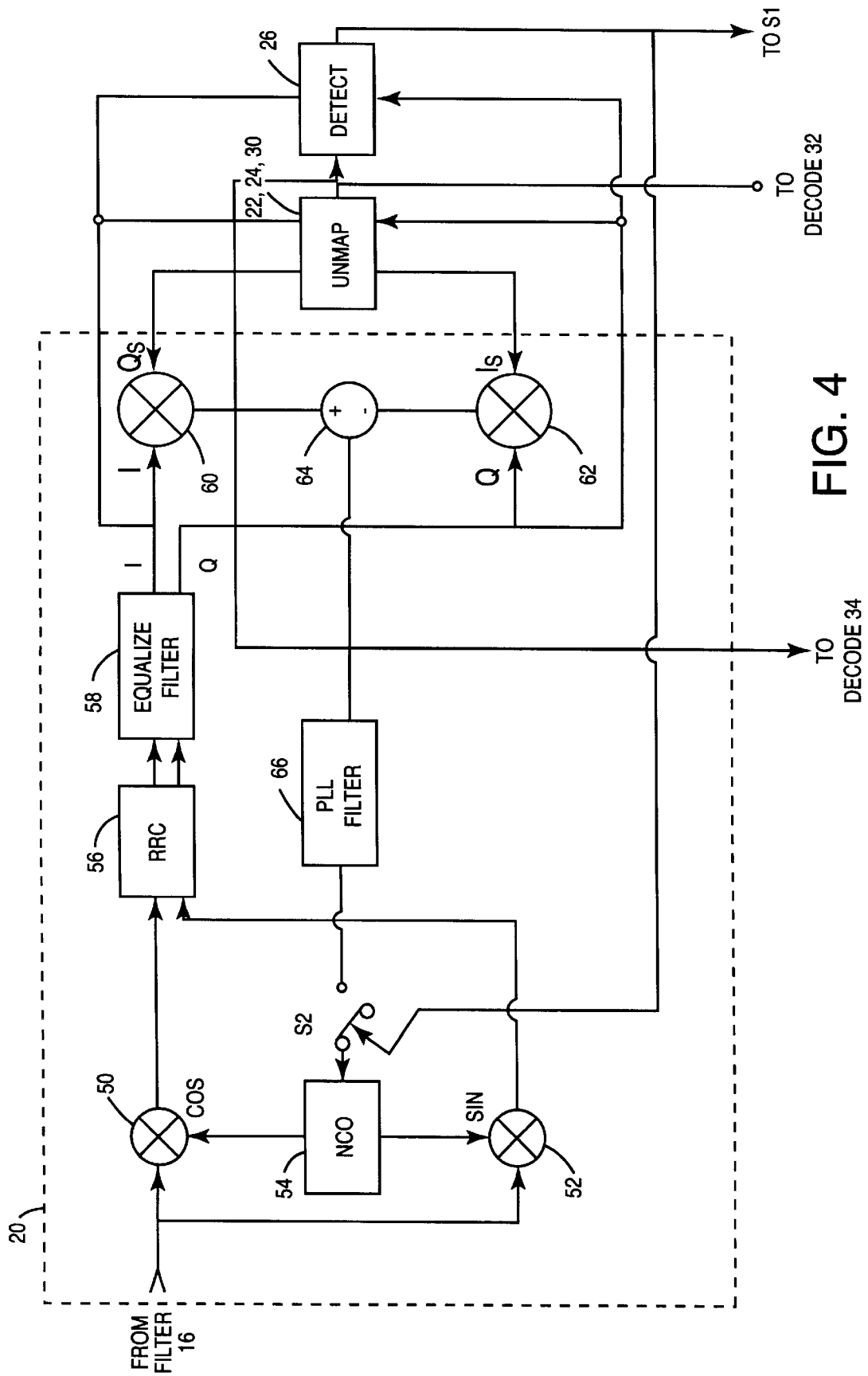
FIG. 4 is a block diagram of a processor used in the receiver illustrated in FIG. 3.

FIG. 4 is a block diagram of processor 20 for demodulating both the above-described non-coherent FSK and coherent 8PSK signals. Unmap circuit 30 and phase slope detector circuit 26 are included in FIG. 4 to aid in the explanation of operation of processor 20. As illustrated in FIG. 4, the carrier signal is input to multiplier circuit 50 and 52. The input carrier signal may be either coherent 8PSK or non-coherent FSK modulated signals. Multipliers 50 and 52 receive second inputs from numerically controlled oscillator 54. The output of multiplier 50 provides a cosine function of the phase of the carrier to root-raised-cosine (RRC) filter 56, and the output of multiplier 52 provides a sine function of the phase of the carrier to RRC filter 56. The outputs of RRC filter 56 are applied through equalizer filter 58 to provide outputs representative of the in-phase amplitude I and the quadrature amplitude Q to respective multiplier circuits 60 and 62, to symbol unmap circuit 30 and to phase slope detector circuit 26.

Unmap circuit 30 provides delayed in-phase and quadrature signals ($I_s$ and $Q_s$) as reference inputs to multipliers 62 and 60, respectively. Unmap circuit 30 also unmaps the I and Q amplitude signals to reconstruct the 8PSK symbol. The outputs of multipliers 60 and 62 are provided to subtractor circuit 64 which, in turn, provides an output to phase lock loop (PLL) filter 66 and to phase slope detector 26. Switch S2 selectively connects the input of oscillator 54 to either the output of PLL filter 66 or to an open circuit. The output of subtractor 64 is also coupled to the input of decode circuit 34 (FIG. 3). Phase slope detector circuit 26 controls the operation of switch S2 and the routing condition of switch S1 (FIG. 3).

Figure 5:
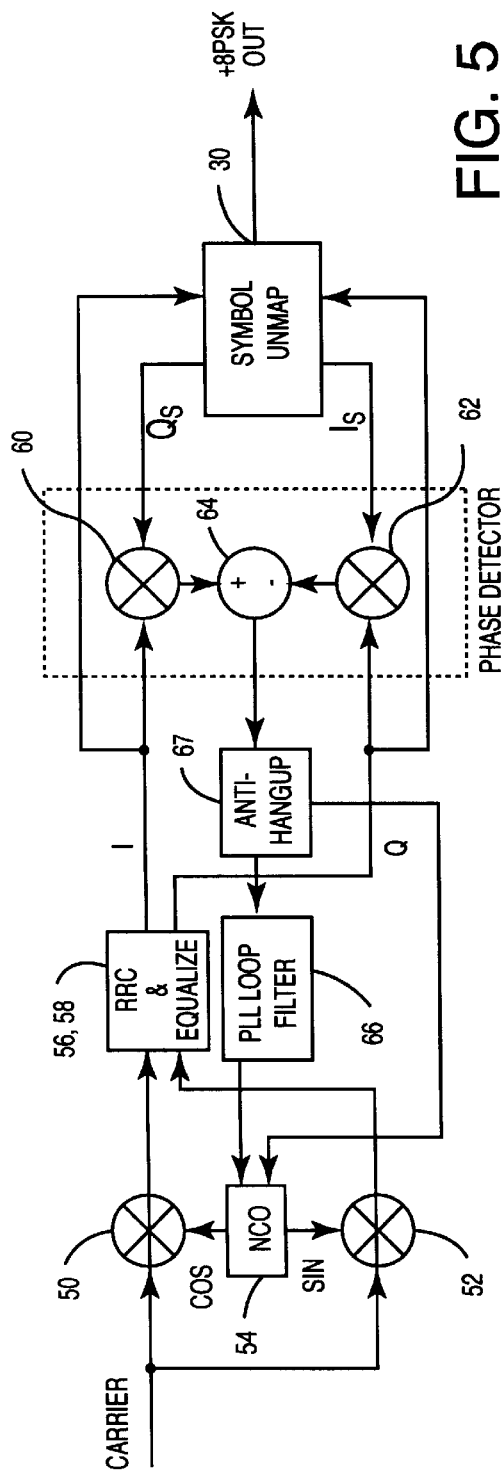
FIGS. 5 and 6 are recast diagrams of the processor illustrated in FIG. 4 illustrating the configuration and operation for demodulating message signals modulated in the 8PSK and FSK protocols, respectively.

Operation of the circuit illustrated in FIG. 4 can best be explained by addressing the demodulation of the 8PSK and FSK signals separately. FIG. 5 is a recast circuit diagram illustrating the operation of the circuit of FIG. 4 for demodulating 8PSK signals. When demodulating 8PSK signals, switch S2 (FIG. 4) is conducting and processor 20 is configured as a decision-directed phase locked loop that tracks the received carrier to provide coherent demodulation. In the preferred form, the phase lock loop is a Costas loop, in which multipliers 60 and 62 and subtractor 64 form a phase detector that controls the output of numerically controlled oscillator 54.

The preamble to the 8PSK message consists of a train of 64 8PSK symbols. The first 60 symbols of the train consist of a repetition of symbols 6,4,6,4,6,4 . . . 6,4,6,4, which is manifest as a constant +high Q amplitude and a low I amplitude that switches back and forth between positive and negative (See Table I). During this period, the gain of automatic gain circuit 12 is set, and the phase detector formed by multipliers 60 and 62 and subtractor 64 operates filter 66 to lock oscillator 54 onto the frequency of the preamble. Equalizer 58 is responsive to the preamble of the 8PSK message and to equalizer coefficients in the message, to compensate for noise in the communication system. If the system is relatively noise-free, equalizer 58 may be omitted. The 8PSK preamble concludes with a four-symbol start command consisting of symbols 4,1,2,1 (Table I).

As will be described below, the circuit of FIG. 3 also decides whether the message signal is in FSK or 8PSK protocol. Although the phase of the 8PSK carrier changes with each new symbol, the phase detector circuit of multipliers 60 and 62 and subtractor 64 provide a phase-stationary reference for the phase lock loop. Thus, the phase shifts in the Q and I signals are combined with reference phases represented by the Qs and Is signals to yield a phase-stationary reference for numerically controlled oscillator 54. Consequently, the phase lock loop illustrated in FIG. 5 operates to map all eight octants into one.

For any given symbol in the 8PSK protocol, the phase error θe is equal to the current phase θ minus an ideal phase θs. It can be shown that for small phase errors (which is usually the case) the phase error is approximately equal to $QI_i - Q_i I$ where $I_i$ and $Q_i$ are the ideal in-phase and quadrature amplitudes. If there is no phase error (i.e., θe=0), the phase of oscillator 54 would be nπ/8 from that of the input carrier, where n is an integer.

Nominally, both the 8PSK carrier and oscillator 54 are at 2,880 Hz. The sampling rate of the phase locked loop is 28.8 KHz, significantly greater than the nominal carrier/oscillator frequency. The sampling rate produces nine phase error samples per symbol. As explained hereinafter, these nine samples are supplied to interpolate circuit 24 (FIG. 3), which operates with symbol synchronization circuit 22, to select one non-zero sample for symbol unmap circuit 30. The non-zero sample is delayed one sample period by symbol unmap circuit 30 to approximate the ideal in-phase and quadrature signals ($I_i = I_s$ and $Q_i = Q_s$) The delayed in-phase and quadrature signals are multiplied with the current quadrature and in-phase signals ($IQ_s$ and $QI_s$) by multipliers 60 and 62. The difference of the outputs of multipliers 60 and 62 is filtered by filter 66 and applied to oscillator 54 to adjust the phase of oscillator 54 to match that of the carrier.

Filter 66 is a digital equivalent to a conventional second order phase locked loop filter with an integrator to reduce steady-state error to zero. Feedback loop delay is about 2 milliseconds which is adequately small to permit the delay to be neglected. To minimize hang-up that might occur when the initial carrier phase is about midway between two symbol phases, filter 66 may optionally include a hang-up circuit 67 that detects a large positive phase error (indicative of hang-up), and sets the following negative phase error to zero. Additionally, the circuit 67 may optionally add a one-time correction of π/8 (one-half of the angle between phases) to remove the hang-up.

The phase lock loop of FIG. 5 causes numerically controlled oscillator 54 to track the frequency of the incoming 8PSK signal and operate multipliers 50 and 52 to provide the raw I and Q signals. The raw I and Q signals consist of single-sided frequency bands at 0–2 KHz and 3.76–7.76 KHz. RRC filter 56 is a low-pass filter that removes signals above 2 KHz, passing only the baseband signals. Thus, the RRC filter removes double-frequency components produced by demodulation and provides matched filtering to the transmitted baseband signal. Thus, processor 20 operates with symbol unmap circuit 30 to demodulate 8PSK signals. When detecting 8PSK signals, symbol unmap circuit 30 operates to provide an output consisting of one of eight 8PSK symbols, based on the I and Q amplitudes processed by processor 20 (Table I).

Figure 6:
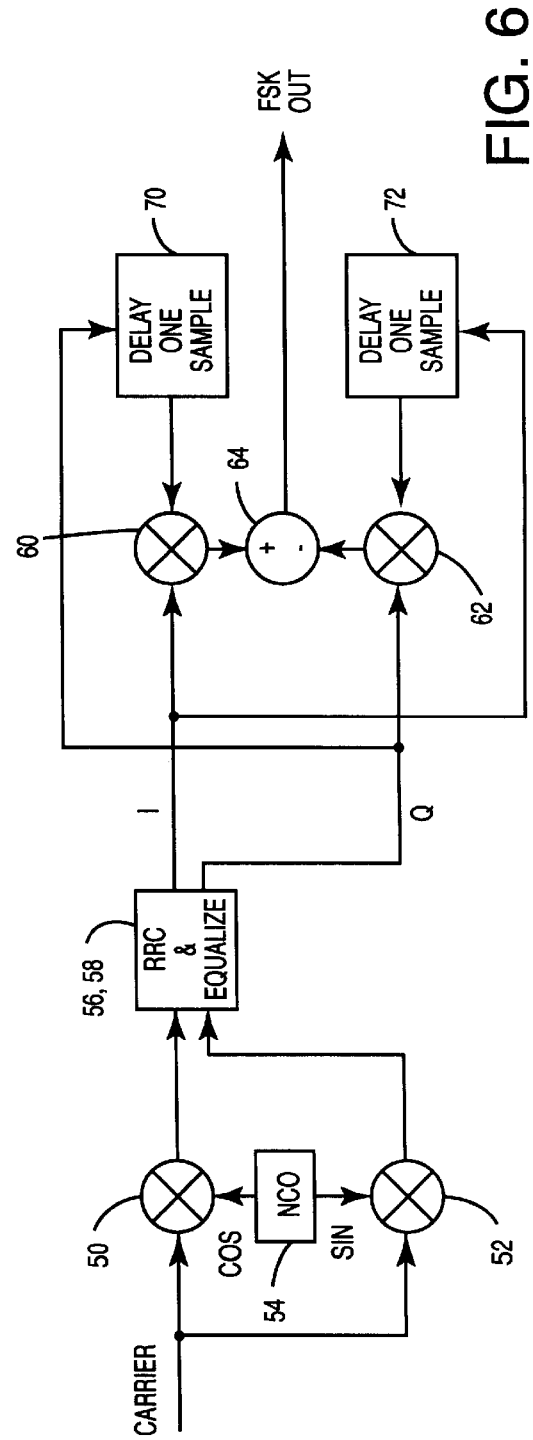

When detecting FSK signals, switch S2 (FIG. 3) is non-conducting so that processor 20 is configured to provide digital signals representing the increasing or decreasing phase of the FSK input signals. FIG. 6 is a recast circuit diagram illustrating the processor of FIG. 3 for demodulating FSK signals. In the preferred embodiment employing the HART protocol, the two HART protocol frequencies are at 1,200 Hz and 2,200 Hz. Numerically controlled oscillator 54 is disconnected from subtractor 64 due to the non-conductive condition of switch S2 (FIG. 3), and the phase-slope signal output is taken directly from the output of subtractor circuit 64. Phase slope detector 26 detects the FSK signal and operates switch S2 to disconnect oscillator 54 from filter 66. Oscillator 54 defaults to a fixed frequency of 1,700 Hz to operate as a local oscillator. The 1,700 Hz signal shifts the upper (2,200 Hz) and lower (1,200 Hz) non-coherent FSK frequencies to +/−500 Hz. Thus, when the upper frequency (2,200 Hz) is received, the demodulator output consists of I and Q signals rotating clockwise around the unit circle at 500 Hz. When the lower frequency (1,200 Hz) is received, the modulator output consists of I and Q signals rotating counter-clockwise around the unit circle at 500 Hz.

RRC filter 56 is active during reception of non-coherent modulation. Nevertheless, the baseband HART signal at 500 Hz is low enough that it is unaffected by the RRC filter. However, the double frequency component of the non-coherent FSK signal is removed by the RRC filter, as in reception of coherent signals. The FSK signals have no preamble or equalizer coefficients to operate optional equalizer 58. Consequently, equalizer 58 is designed to default to the center band and has little or no effect on the signal processing during reception of FSK signals.

Detection of FSK signals is based on measuring the slope of the phase. When the upper frequency is received, the phase of the demodulator output continuously decreases;

when the lower frequency is received, the phase continuously increases. Thus, the slope of the phase represents the desired high (1) or low (0) logical level:

$$S = \frac{\theta_n - \theta_{n-1}}{t_n - t_{n-1}},$$

where S is the slope, $\theta_n$ is the phase at sample n, $t_n$ is the time at sample n, $\theta_{n-1}$ is the phase of the previous sample and $t_{n-1}$ is the time at the previous sample. With a sample rate of 28.8 KHz, the phase change during one sample interval is small. The phase difference $(\theta_n - \theta_{n-1})$ can be represented approximately as $Q_n I_{n-1} - I_n Q_{n-1}$ Consequently, the slope S can be represented as $S \approx Q_n I_{n-1} - I_n Q_{n-1}$ which is positive or negative, depending on which term $Q_n I_{n-1}$ or $I_n Q_{n-1}$ is larger.

Unmap circuit 30 (FIGS. 3 and 4) operates as two delay circuits 70 and 72 that delay the respective I and Q signals by one sample outputs to form $I_{n-1}$ and $Q_{n-1}$. The I and Q signals of the current sample are supplied by equalizer 58 to multiplier circuits 60 and 62, respectively. The delayed I and Q signals from the prior sample $(I_{n-1}$ and $Q_{n-})$ are supplied to multipliers 62 and 60, respectively. Hence, multipliers 60 and 62 derive signals representing the terms $Q_n I_{n-1}$ and $I_n Q_{n-1}$. The results are subtracted by subtractor 64 to derive a signal that is positive or negative, depending on the binary value of the input data, which is provided as an output from processor 20 to decoder 34 (FIG. 3).

Referring to FIG. 3, operation of the receiver may be explained. The FSK and 8PSK input signals are received by automatic gain control circuit 12. The preambles of the FSK and 8PSK operate on circuit 12 to set the gain so that the signals supplied to analog-to-digital converter 14 are of proper strength. Filter 16 removes any DC offset component of the digital signal and the resulting carrier signal is applied to processor 20. The Q and to output signals developed by processor 20 are applied to symbol synchronization circuit 22 which includes a pair of squaring circuits 80 and 82 that square the Q and I amplitudes, and a summing circuit 84 that sums the result to produce a 3,200 Hz sinusoidal signal. The peaks of the signal provided by summing circuit 84 correspond to the symbol sampling instant. Bandpass filter 86 is a two-pole Butterworth bandpass filter having a bandwidth of between 3,190 Hz and 3,210 Hz, corresponding to the frequency of signals from summing circuit 84. In the case of 8PSK protocol signals, the amplitude of the quadrature signal remains high during the 60-symbol portion of preamble. Due to its narrow bandwidth, filter 86 produces a slowly varying sinusoidal signal output that reaches a peak near the end of the 60-symbol preamble to the 8PSK modulation. The FSK protocol signals do not produce these peaks. Filter 86 provides an output to peak detector 88 for 8PSK symbol synchronization, and an output to phase slope detector circuit 26 to identify the protocol of the modulated signals (e.g., 8PSK or FSK).

Phase slope detector circuit 26 includes comparator 90 having a first input that receives the signal from filter 86, and a second input that receives a reference signal from the output of subtractor 64. Comparator 90 is responsive to the signal from filter 86 at or near the peak of the 8PSK preamble to provide an output to filter 92. Since the HART message fails to provide this peak, comparator 90 effectively decides whether the input signal is in 8PSK or FSK protocol due to the presence or absence of the peak. The output of filter 92 is high whenever processor 20 processes 8PSK carrier signals and is low whenever processor 20 processes FSK carrier signals. The high output of filter 92 operates switch S2 (FIG. 4) to its conductive state and operates switch S1 to supply output derived from the 8PSK coherent modulation. The low output of filter 92 operates switch S2 to its non-conductive state and operates switch S1 to supply output derived from the FSK non-coherent modulation.

Peak detector 88 detects the peaks of the slowly varying signals output from filter 86 and operates with interpolate circuit 24 to define the sample of the 8PSK signal to be used for unmapping. As previously described, processor 20 samples each symbol signal nine times during each cycle to derive nine samples of the I and Q amplitudes. Generally, the position of these nine samples on the sine wave from peak detector 88 represent the difference in frequency between the clocks of the transmitter and receiver. While the receiver selects the sample closest to the peak, the sample might be off by as much as ½ of the sample time. Peak detector 88 and interpolate circuit 24 operate to select the I and Q samples having the highest values (closest to the peak), and sets the remaining samples to zero. As a result, the received symbols are synchronized to less than $\frac{1}{18}^{th}$ of the modulated signal transmitted by the transmitter. Unmap circuit 30 receives the selected I and Q sample from interpolate circuit 24. Unmap circuit 30 delays sample signal to provide single symbol delay signals, $I_s$ and $Q_s$ to processor 20. Unmap circuit also unmaps the I and Q signals to select one of the eight symbols as associated with the I and Q amplitudes, as identified in Table I. Conveniently, unmap circuit 30 includes a look-up table for selecting the symbol based on the amplitudes of the I and Q signals. Decode circuit 32 decodes the selected symbol to the corresponding 3-bit representation for supplying to switch S1.

In the event phase slope detector circuit 26 detects FSK non-coherent modulation, delay circuits 70 and 72 (FIG. 6) formed by circuits 22, 24 and 30, generate the first and second reference signals for processor 20. Additionally, the signal representative of the phase slope from subtractor 64 (FIG. 4) is input to slicer 94 of decoder 34. Slicer 94 receives a second input representative of a zero phase slope. Slicer 94 provides a +1 output if the slope of the phase is greater than or equal to zero and provides a −1 output if the slope is smaller than zero. The output of slicer 94 is supplied to filter 96, which derives a binary output representative of the mean of five samples of positive or negative output from slicer 94. Thus, if the mean of five samples from slicer 94 is positive, filter 96 provides a logical zero or low level output to switch S1, whereas if the mean of five samples from slicer 94 is negative, filter 96 provides a logical one or high level output to switch S1.

The present invention thus provides a receiver for receiving messages from a plurality of industrial process control transmitters by a two-wire communications link. While the invention is described in connection with the HART PSK protocol and the HSH 8PSK protocol, the invention is applicable to other forms of coherent and non-coherent signal protocols and other forms of frequency shift keying and phase shift keying protocols, such as BPSK, QPSK, etc. The data rate ranges and frequency ranges are given by way of example, and not of limitation, as other ranges would occur to those skilled in the art.

The processor is described as employing circuitry common to both demodulation techniques, with detection circuitry to identify the protocol of received modulation to configure the processor to demodulate the identified protocol. Clearly, the invention may be implemented in software to digitally perform the functions of the invention on digital representations of signals without departing from the scope or spirit of the invention. In either case, the invention allows the functional blocks (in circuits or software) to be shared for demodulation of each signal protocol. Thus, the invention permits minimization of the power consumption and cost of the receiver receiving diverse and incompatible message protocols. The receiver, and its included processor, is efficient in operation and economically expands the versatility of existing industrial process control systems.

The receiver according to the present invention is preferably incorporated in an industrial process control transmitter to receive FSK and 8PSK message signals from a control or central station via a two-wire communication link. The receiver may also be included in the control or central station to receive FSK and 8PSK message signals from the industrial process control transmitter via the two-wire communication link.

Although the present invention has been described with reference to preferred embodiments, workers skilled in the art will recognize that changes may be made in form and detail without departing from the spirit and scope of the invention.

What is claimed is:

1. An industrial process control instrument having a receiver to receive and demodulate message signals that are modulated in either a coherent signal protocol or a non-coherent signal protocol, the receiver including:
   processor means for receiving message signals and selectively configurable to a first configuration to demodulate message signals modulated in the non-coherent signal protocol to provide phase slope signals representing increasing and decreasing slope of a phase of the message signal, and to a second configuration to demodulate message signals modulated in the coherent signal protocol to provide in-phase and quadrature signals representing a phase relationship of the message signals received by the input;
   detector means for identifying the protocol of the received message signals; and
   switch means responsive to the detector means for switching the processor between its first and second configurations.

2. The industrial process control instrument of claim 1, further including:
   a communications link to couple the receiver to a plurality of transmitters;
   an input to receive message signals from the communications link;
   the switch means configures the processor means to its first configuration when the detector means identifies the non-coherent signal protocol, and configures the processor to its second configuration when the detector means identifies the coherent signal protocol.

3. The industrial process control instrument of claim 2, further including:
   a first decoder responsive to the phase slope signals to provide a digital representation of the message signals modulated in the non-coherent signal protocol, and
   a second decoder responsive to the in-phase and quadrature signals to provide a digital representation of the message signals modulated in the coherent signal protocol.

4. The industrial process control instrument of claim 1, further including:
   a first decoder responsive to the phase slope signals to provide a digital representation of the message signals modulated in the non-coherent signal protocol, and
   a second decoder responsive to the in-phase and quadrature signals to provide a digital representation of the message signals modulated in the coherent signal protocol.

5. The industrial process control instrument of claim 1, wherein the processor means includes:
   a demodulator responsive to the message signal to derive in-phase and quadrature signals based on the message signal, and
   a phase detector responsive to the in-phase and quadrature signals and to delayed in-phase and quadrature signals to derive a phase signal based on a difference between the product of the in-phase and delayed quadrature signals and the product of the quadrature and delayed in-phase signals.

6. The industrial process control instrument of claim 5, further including a loop filter, the switch means comprises a switch responsive to the detector means identifying the coherent signal protocol to connect the loop filter between the phase detector and the demodulator so that the phase detector and demodulator operate as a phase locked loop, and the switch is further responsive to the detector means identifying the non-coherent signal protocol to disconnect the loop filter from between the phase detector and the demodulator to operate the demodulator to a default frequency so that the phase detector provides the phase slope signal having an increasing or decreasing phase.

7. The industrial process control instrument of claim 6, wherein the demodulator includes:
   a controllable oscillator operable to provide an oscillator signal having a selectively controllable frequency, and
   first and second multipliers coupled to receive the message signals and to the oscillator to derive respective in-phase and quadrature signals based on the message signals.

8. The industrial process control instrument of claim 6, wherein the phase detector includes:
   a third multiplier responsive to the in-phase signal and a first reference signal based on the delayed quadrature signal,
   a fourth multiplier responsive to the quadrature signal and a second reference signal based on the delayed in-phase signal, and
   a subtractor coupled to the third and fourth multipliers to derive a phase signal.

9. The industrial process control instrument of claim 5, wherein the non-coherent signal protocol is a frequency shift keying (FSK) protocol such that message signals in the FSK protocol have a first frequency representing a first logical state and a second frequency representing a second logical state, and the coherent signal protocol is a phase shift keying (PSK) protocol such that message signals at a third frequency in the PSK protocol are phase shifted to represent symbols, wherein the receiver further includes:
   a loop filter;
   wherein the demodulator includes:
      a controllable oscillator providing an oscillator signal having a selectively controllable frequency, and
      first and second multipliers coupled to receive the message signals and to the oscillator to derive respective in-phase and quadrature signals based on the message signals; and
   wherein the phase detector includes:
      a third multiplier responsive to the in-phase signal and a first reference signal based on the delayed quadrature signal,
      a fourth multiplier responsive to the quadrature signal and a second reference signal based on the delayed in-phase signal, and a subtractor coupled to the third and fourth multipliers to derive a phase signal;

the switch means is responsive to the detector means identifying PSK protocol message signals to connect the loop filter between the subtractor and the oscillator to operate the demodulator and phase detector as a phase locked loop and control the frequency of the oscillator signal to a demodulation frequency to demodulate the PSK protocol message signals, the switch means is responsive to the detector means identifying FSK protocol message signals to control the frequency of the oscillator signal to a demodulation frequency different from the first and second frequencies to demodulate the FSK protocol message signals.

10. The industrial process control instrument of claim 9, wherein the detector means includes:

a narrow bandpass filter responsive to the in-phase and quadrature signals to identify the PSK protocol, and a comparator coupled to the narrow bandpass filter and the subtractor.

11. The industrial process control instrument of claim 10, including:

a peak detector connected to the narrow bandpass filter to provide a varying signal waveform representing an aspect of the message signal in the PSK protocol, an interpolator responsive to the peak detector to select a symbol sample from the in-phase and quadrature signals, and an unmapper responsive to the in-phase and quadrature signals to supply the symbol represented by the phase of the message signal.

12. The industrial process control instrument of claim 11, including a first decoder responsive to the symbol supplied by the unmapper to provide a binary representation of the symbol.

13. The industrial process control instrument of claim 12, including a second decoder responsive to the phase slope signal to provide a binary representation based on the increasing or decreasing state of the phase of the phase slope signal.

14. A selectively configurable processor for demodulating coherent and non-coherent modulated industrial process control message signals, comprising:

an input for receiving coherent and non-coherent modulated input signals;

a demodulator coupled to the input to derive in-phase and quadrature signals based on the input signals;

a delay for deriving first and second reference signals based on delayed in-phase and quadrature signals;

a phase detector responsive to the in-phase and quadrature signals and the first and second reference signals to derive a phase signal;

a loop filter; and a selector responsive to the in-phase and quadrature signals and to the phase signal to selectively connect the loop filter between the phase detector and the demodulator, the demodulator being responsive to filtered phase signals to lock onto a frequency of the input signals when the selector connects the loop filter between the phase detector and the demodulator so that the phase detector, loop filter and demodulator operate as a phase locked loop to demodulate coherent modulated signals, the selector operating the demodulator to demodulate non-coherent modulated signals when the selector does not connect the loop filter between the phase detector and the demodulator.

15. The processor of claim 14, wherein the demodulator includes a controllable oscillator responsive to the phase signal to lock onto a demodulating frequency signal for the coherent modulated signals and responsive to the absence of the phase signal to provide a demodulating frequency signal for the non-coherent modulated signals.

16. The processor of claim 14, wherein the selector includes:

a detector responsive to the in-phase and quadrature signals for identifying the coherency of the modulated signals, and a switch responsive to the detector for selectively connecting the loop filter between the phase detector and the demodulator.

17. The processor of claim 14, further including:

a first decoder for decoding the in-phase and quadrature signals to derive a digital representation of the coherent modulated signal, and a second decoder responsive to the phase signal for decoding the phase signal to derive a digital representation of the non-coherent modulated signal.

18. A process of demodulating coherent and non-coherent modulated industrial process control message signals at an input of a receiver of an industrial process control instrument having a demodulator, a phase detector and a filter, comprising steps of:

deriving in-phase and quadrature signals based on the input modulated signals using the demodulator;

deriving a phase signal based on the in-phase and quadrature signals using the phase detector;

detecting the presence or absence of coherent modulated signals based on the in-phase and quadrature signals;

upon detection of a presence of coherent modulated signals, coupling the filter between the phase detector and the demodulator to operate the demodulator, phase detector and filter as a phase locked loop to demodulate the input message signal; and upon detection of an absence of coherent modulated signals, operating the demodulator at a default frequency to demodulate input modulated signals.

19. The process of claim 18, including steps of:

unmapping the in-phase and quadrature signals to derive symbols based on the coherent message signal, and decoding the symbols to derive a digital representation of the coherent modulated signal.

20. The process of claim 18, including steps of:

deriving a phase slope signal by the phase detector when the loop filter is decoupled from between the phase detector and the demodulator, the phase signal having an increasing or decreasing phase representing data, and decoding the phase signal to derive a digital representation of the non-coherent modulated signal.

* * * * *